E. G. BERG.
FEATHER REMOVING DEVICE.
APPLICATION FILED JULY 30, 1913.

1,217,393.

Patented Feb. 27, 1917.
3 SHEETS—SHEET 1.

Witnesses

Inventor
Emil G. Berg,
his Attorney

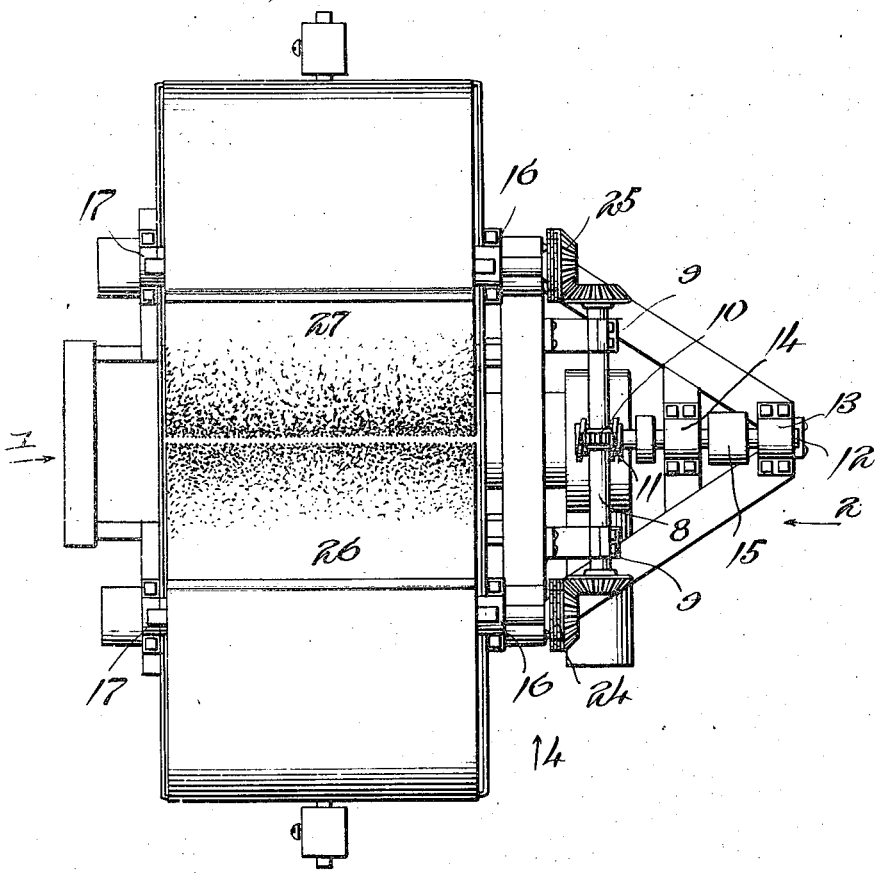
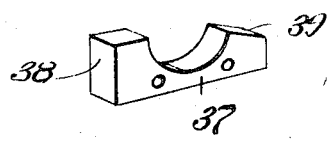

E. G. BERG.
FEATHER REMOVING DEVICE.
APPLICATION FILED JULY 30, 1913.

1,217,393.

Patented Feb. 27, 1917.
3 SHEETS—SHEET 3.

UNITED STATES PATENT OFFICE.

EMIL G. BERG, OF FARIBAULT, MINNESOTA.

FEATHER-REMOVING DEVICE.

1,217,393.  Specification of Letters Patent.  Patented Feb. 27, 1917.

Application filed July 30, 1913. Serial No. 782,018.

*To all whom it may concern:*

Be it known that I, EMIL G. BERG, a citizen of the United States, residing at Faribault, in the county of Rice and State of Minnesota, have invented certain new and useful Improvements in Feather-Removing Devices, of which the following is a specification.

The object of this invention is to provide a machine for removing feathers from fowl.

The tedious operation of plucking feathers from chicken or other fowl not only consumes a great deal of time in small households but is a source of great expense in markets, hotels and other places of business where large numbers of fowl are required to be dressed. Also in retail establishments when it is desired to sell live fowl and dress the same after being sold, a great deal of time is required in filling such orders.

It is one of the objects of my invention to provide a machine adapted to quickly remove the feathers and to perform this operation without in any way mutilating or defacing the skin of the fowl.

In this connection it is one of the objects of my invention to provide a machine wherein the pressure desired in the removal of the feathers can be applied and varied in accordance with the size of the fowl so as not only to extend the utility of the machine to all kinds of fowl but also render the same efficient irrespective of the size of the fowl to be dressed.

A further object of the invention is to provide means for conveying the removed feathers away from the point or points of operation upon the fowl so as not to interfere with the sight of the operator.

The invention will be more fully described in connection with the accompanying drawings and will be more particularly pointed out in and by the appended claim.

In the drawings:

Fig. 3 is a plan view.

Fig. 6 is a perspective view of another detail of construction.

Like characters of reference designate similar parts throughout the different figures of the drawings.

Figure 1:
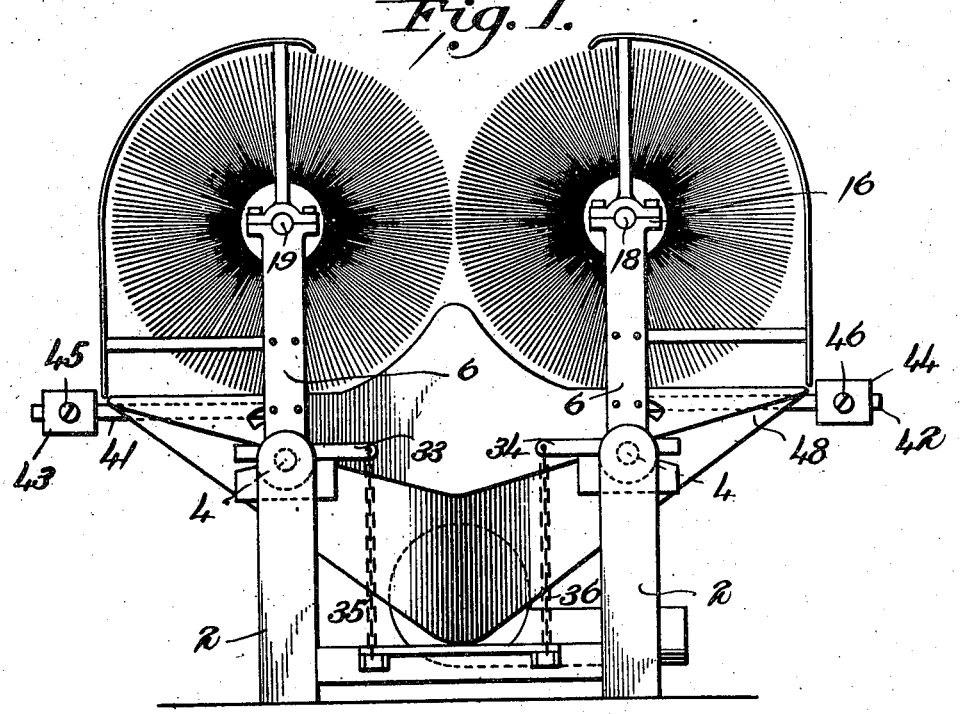
Figure 1 is a view in side elevation looking in the direction of arrow 1 of Fig. 3, showing one form of my invention.

As illustrated, the device of my invention includes a frame comprising upward bearing posts 1—1 and 2—2 which are suitably braced and connected by longitudinal and transverse frame members. In the bearing posts 1 and 2 are mounted short shafts 3 and 4 on the adjacent ends of which are mounted bearing arms 5 and 6 on which the feather removing means are carried. On the shaft 3 I provide bevel gears 6' which mesh with bevel gears 7 disposed upon a driven shaft 8. The driven shaft 8 is mounted in bearings 9 and may be provided centrally of its ends with a worm wheel 10 adapted to mesh with a worm 11. The worm 11 is mounted upon a drive shaft 12 which is journaled in bearings 13 and 14. Intermediate the bearings 13 and 14 I may provide a pulley 15, or any means for operating the drive shaft 12. If desired, an electric motor or a prime mover may be directly connected with the drive shaft 12.

I have described and illustrated the foregoing specific driving arrangement because the same represents one of the simplest forms for use in this connection, but it will be understood that I do not wish to be limited to this specific arrangement.

The upper ends of the bearing arms 5 and 6 are provided with suitable bearings 16 and 17 in which are journaled shafts 18 and 19. These shafts 18 and 19 carry sprocket wheels 20 and 21 over which sprocket chains 22 and 23 are trained, said chains, at their lower ends being trained about sprocket wheels 24 and 25 which can be conveniently formed with bevel gears 6', but which may be separately formed and secured to the shafts 3 and 4.

Figure 2:
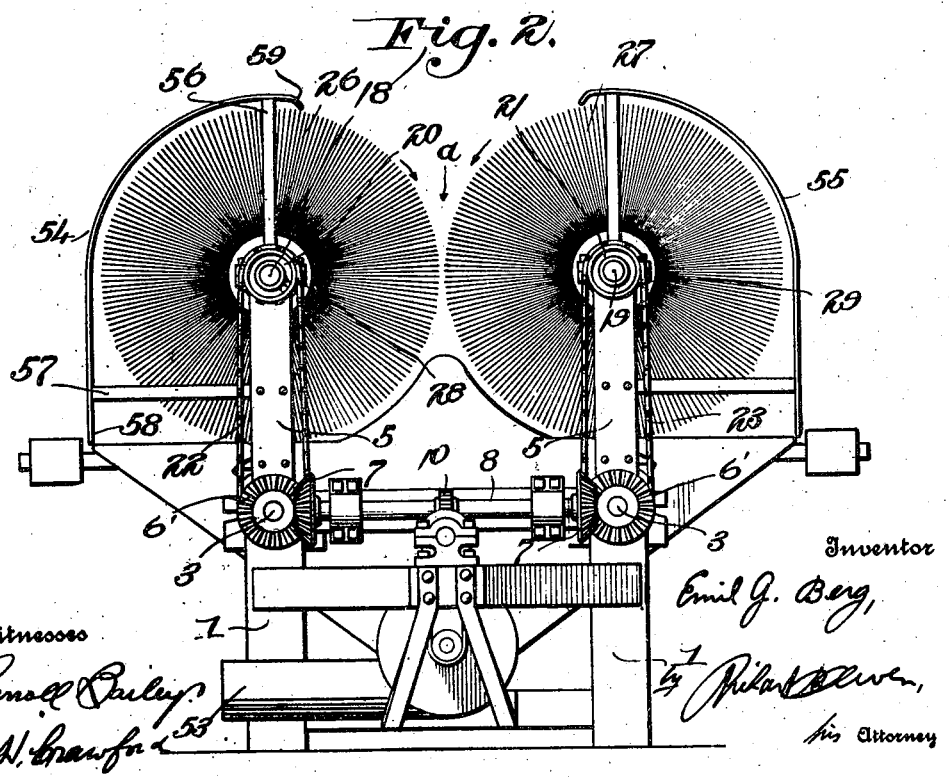
Fig. 2 is a view in elevation looking in the direction of arrow 2 of Fig. 3.

Feather removing means in the form of brushes 26 and 27 are mounted upon shafts 18 and 19, respectively, and are adapted to be rotated in the direction of arrows shown in Fig. 2.

The brushes may be formed of any soft non-metallic material, as regards the bristles, and the bristles are of relatively great length with respect to the cores 28 and 29 so that there will be no danger of the fowl being impinged between any such unyielding rotary bodies as the cores.

Furthermore, the bristles of the brushes will necessarily be of material which readily flex when the fowl is interposed between the brushes so that in functioning to remove the feathers, the brushes will not act in the capacity of pickers or pluckers but will rather cause removal of the feathers by sustained frictional contact, and by reason of the relatively high speed with which the brushes will be rotated.

In order to permit the operator to easily vary the distance between the brushes in accordance with the size of the fowl being operated upon, I provide a treadle mechanism which may be in the form shown.

Figure 4:
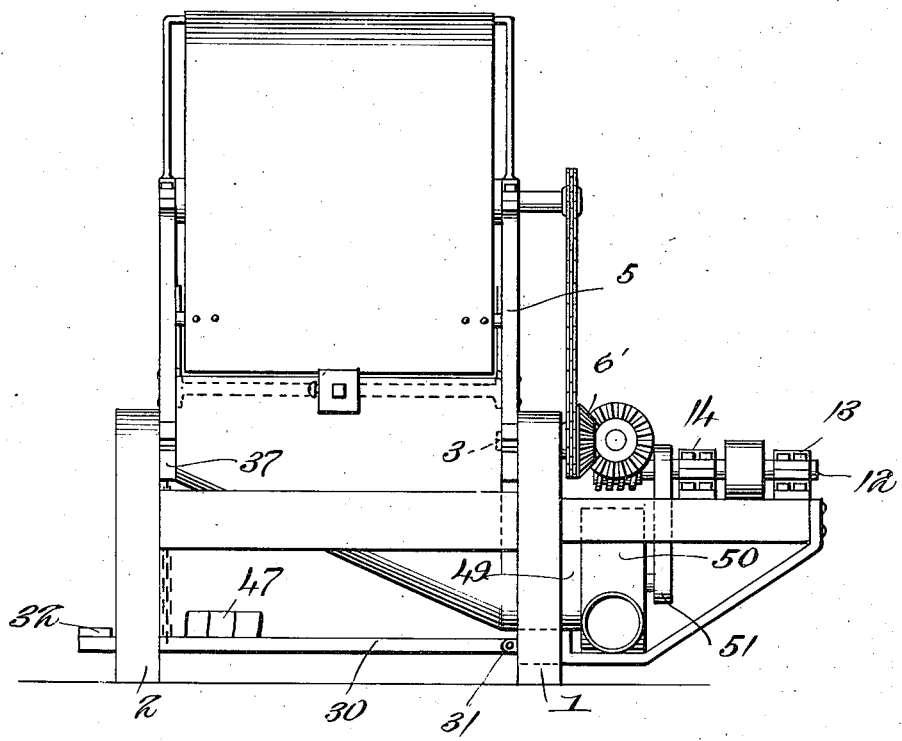
Fig. 4 is a view looking in the direction of arrow 4 of Fig. 3.
Figure 5:
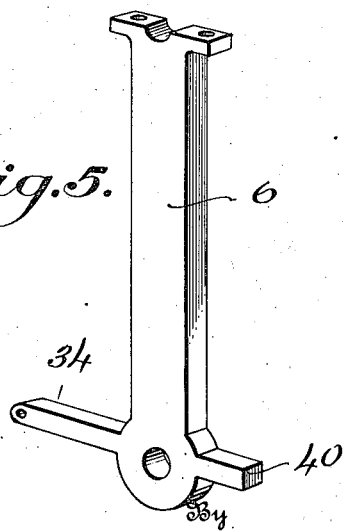
Fig. 5 is a perspective view of a detail of construction.

Referring to Figs. 1 and 4, treadle bars 30 are pivotally mounted at 31, to the upright bearing posts 1. The bars 30 project between the bearing posts 2 and are connected by a transverse treadle bar 32.

I conveniently provide arms 33 and 34 on the arm 6, and connect the arms 33 and 34 by chains 35 and 36 with the treadle bars 30. Stop devices preferably in the form of blocks are secured to the bearing posts 1 and 2 and one of said blocks is shown in perspective in Fig. 6, and is indicated at 37. The block 37 has a stop portion 38 adapted to be engaged by one of the arms 33 or 34, in accordance with the post to which the block is secured. This stop 38, as will be readily seen by reference to Fig. 1, is arranged to normally limit movement of the brushes toward each other beyond the position shown in Fig. 1. The block 37 has an inclined downwardly limiting stop portion 39, adapted to be engaged by an outwardly limiting lug 40 on arm 6. Thus the outward movement of the brushes on the bearing arms 5 and 6, due to the interposition of the body of the fowl between said brushes, will be permitted by this construction against the resistance of whatever power the operator may apply to the treadle bar 32.

In practice, I have found it desirable to provide means for normally causing the brushes to seek an outward position, and in the form shown I secure to the bearing arms 6 weighted arms 41 and 42, having disposed on their outer ends, weights 43 and 44, which may be adjusted to the desired positions and locked in such position by means such as screws 45 and 46.

In order to partially counterweight the action of weights 43 and 44 so that downward movement of the treadle will not involve a pressure lifting the full weight of the parts, I may provide suitable weights 47 on the treadle.

Below the brushes 18 and 19, a trough 48 is disposed and the same converges downwardly and preferably discharges at 49, axially into a fan 50. The fan 50 is belted, as indicated at 51, from its pulley to a pulley 52 on the drive shaft 12. The fan 50 is for the purpose of exhausting feathers from the trough or receiver 48 and discharging the same through a pipe 53 to any suitable point.

I have also provided guards 54 and 55 which I conveniently mount upon arms 56 and 57, adapted to be secured to the bearing arms 5 and 6, and as both guards are similar only one need be described in detail. The lower edge 59 of the guard 54 extends downwardly to the trough and when the brush 18 is swung outwardly the lower edge 58 will descend below the top of the trough so as to prevent movement of the feathers outwardly from over the top of the trough. To a certain extent the exhaust may fail to withdraw all the feathers impinged upon the ends of the bristles, or between the same, and I desire to provide downwardly bent guard ends 59, which will prevent such feathers from being carried inwardly from this terminal of the guard.

In order to facilitate removal of the feathers, the fowl to be dressed may be scalded so as to open the pores of the skin, or any other preliminary treatment may be given the fowl in accordance with conditions under which the machine is operated. However, I desire to have it understood that in practice, the device of my invention will be effective in removing the feathers without such preliminary treatment.

In operation one or more fowl may be held by the neck with the tails projecting downwardly between the brushes as indicated by the arrow a shown in Fig. 2. As the fowl is allowed to descend between the brushes the bristles will flex and the interposition of the body of the fowl will tend to separate the brushes or cause the same to spread from each other. This separation will be counteracted by suitable pressure on the foot treadle so that the pressure of the bristles upon the fowl may be such as to effectively remove the feathers. The flexure of the bristles will be such that the body of the fowl will be completely circumferentially engaged by the bristles so that removal action will be complete upon all portions of the body. However, the action will be more intense at opposite points of the body nearest the axes of the brushes and if it is desired to turn the body so as to bring other portions thereof into more intense action by the brushes, the fowl can be lifted and turned ninety degrees and again lowered between the brushes. After the feathers from all portions of the fowl have been removed except from the head and neck which are held by the operator, the body of the fowl can be inverted and suspended by the feet so as to remove the feathers from the head and neck.

While I have herein shown and described one specific form of my invention, I do not wish to be limited thereto, except for such limitations as the claim may import.

I claim:—

In a machine of the character described, a supporting frame, parallel shafts journaled in said frame, pairs of upright bearing members mounted on said shaft and movable thereon, other shafts journaled in said bearing members, brushes carried by said last mentioned shafts, means to rotate said last mentioned shafts and said brushes, arms projecting outwardly from and disposed at right angles with respect to said bearing members, weights adjustably mounted on said arms normally tending to retain said brushes out of engagement with each other, other arms projecting inwardly from said bearing members disposed in a plane below the plane of said first mentioned arms, a weighted treadle carried by said supporting frame, and means connecting said treadle and the inner ends of said last mentioned arms, substantially as described.

In testimony whereof I affix my signature in presence of two witnesses.

EMIL G. BERG.

Witnesses:
CHAS. F. EBEL,
HENRY A. DUCHARME.